April 20, 1937.  T. THOMPSON  2,077,648
WATER TURBINE
Filed July 25, 1935
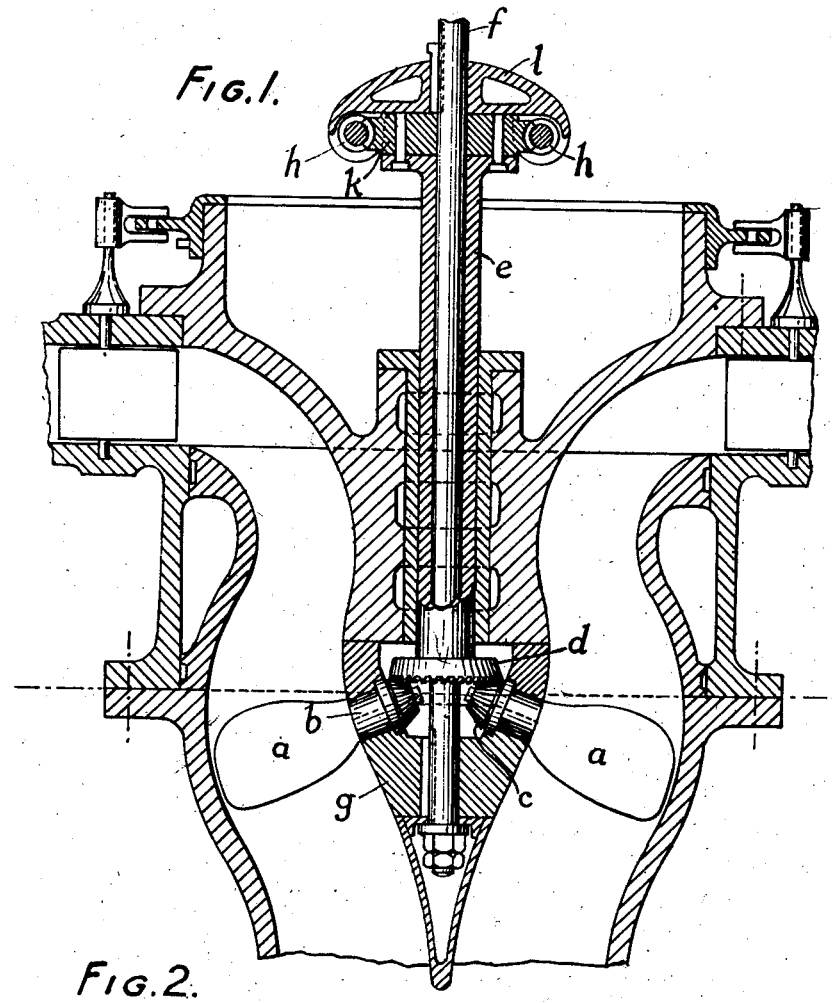
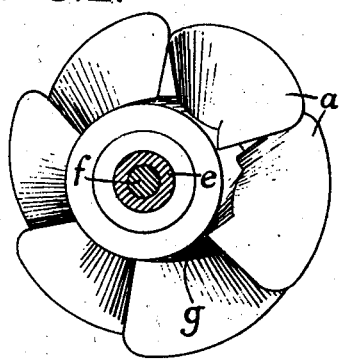
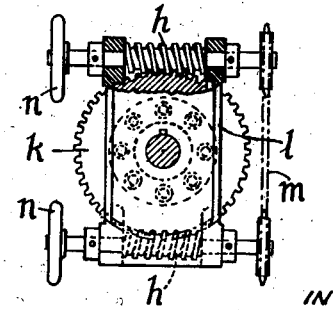
INVENTOR
THOMAS THOMPSON
BY H. R. Willson & Co.
ATTORNEYS Patented Apr. 20, 1937

2,077,648

UNITED STATES PATENT OFFICE 2,077,648

WATER TURBINE

Thomas Thompson, Sydenham, London, England

Application July 25, 1935, Serial No. 33,133
In Great Britain July 28, 1934

1 Claim. (Cl. 253—148)

This invention relates to water turbines of the kind described in my prior patent specification No. 1,803,220 and has for its object to enable the pitch of the blades to be adjusted in a simple and effective manner in order to utilize the flow of water through the turbine to the fullest possible advantage.

According to this invention the shanks of the blades are mounted to turn in bearings in the boss of the rotor and are prolonged to receive bevel pinions which are geared with a single bevel gear wheel formed with teeth on the underside and carried by a tube or sleeve mounted on the rotor shaft and adapted to rotate therewith but capable of being adjusted angularly thereof to effect the adjustment of the blades in the supporting boss which is keyed on the lower end of the said shaft.

In carrying out the invention the boss of the rotor is suitably enlarged and recessed around the axis to accommodate the adjusting wheel and pinions, the pinions being secured one on each blade shank and supported in counterbored openings in the boss in which the shanks of the blades are held at any required angle. All the pinions are constantly in mesh with a ring of gear teeth formed on the underside of the adjusting gear wheel and this is operated by the aforesaid tube or sleeve on the rotor shaft, which extends to a convenient point outside the turbine casing where it is equipped with suitable operating and securing means.

In the accompanying drawing:—

Fig. 1 is a sectional elevation of part of a turbine, with blade mechanism constructed according to this invention and shown partly in section.

Fig. 2 shows a perspective view of the blades with the shaft and sleeve in cross-section.

Fig. 3 is a plan of the adjusting mechanism on a larger scale.

Referring to the drawing it will be seen that the method for rotating the blades (a) consists of prolonging the shanks (b) of the blades, these shanks being mounted to turn in bearings in the boss of the rotor, and fixing on them bevel pinions (c) which are geared with a single bevel wheel (d) fixed on a sleeve (e) round the main shaft (f) and having the teeth on the underside.

The sleeve is adapted to rotate with the shaft f but is capable of being adjusted angularly thereof to effect the adjustment of the blades a in the supporting boss (g) which is keyed on the lower end of said shaft. As shown in Fig. 3, and at the top of Fig. 1, one form of hand actuated adjusting mechanism consists of two worms (h) on opposite sides of a worm wheel (k) held in position by a bracket (l) keyed to the main shaft of the turbine.

The two worms are joined by a sprocket chain (m) and a capstan (n) or other hand wheel is fitted to each shaft as shown in diagram.

Fig. 2 simply shows the arrangement of the blades and the method of placing the sleeve round the shaft.

The action of the adjusting mechanism is as follows:—

By rotating the hand wheels (n) at the top of the sleeve, the sleeve is rotated through the worm gear and thus the bevel wheel at the bottom.

By this means the blades can be rotated about their axes in either direction, and set to any required angle according to the head of water or the power required.

This method of operating the simultaneous movements of the gate and blade controls in unison for maintaining the same relative efficiency under varying conditions of the flow whilst the turbine is in motion is not hereby shown as not being necessary to the elucidation of the invention.

I claim:

In a hydraulic turbine, a casing having an upper end wall and inlets directly below said end wall, said casing having an outlet at its lower end and a central internal bearing boss projecting downwardly from said upper end wall, said boss having a vertical cylindrical bearing opening, a vertical sleeve rotatably mounted in said bearing opening and extending to a point above said casing, the lower end of said sleeve being provided with a beveled gear at the lower end of said boss, a cup-shaped rotor hub enclosing said beveled gear and abutting said lower end of said boss, pitched rotor blades having trunnions rotatably mounted in openings in the side wall of said cup-shaped hub, said trunnions having beveled pinions within the cup of the hub and meshing with said beveled gear, a central vertical shaft passing through said sleeve and secured to the bottom portion of the cup-shaped hub, a worm wheel coaxial with said shaft and secured to the upper end of said sleeve, a head member secured to said shaft directly over said worm wheel, and a worm rotatably mounted on said head member and meshing with said worm wheel for rotating said shaft and sleeve relatively to vary the pitch of said rotor blades.

THOMAS THOMPSON.